United States Patent

Cooper

(10) Patent No.: US 9,606,342 B2
(45) Date of Patent: Mar. 28, 2017

(54) LASER BEAM SELECTORS

(75) Inventor: Jeremy R. Cooper, Issaquah, WA (US)

(73) Assignee: GE Healthcare Bio-Sciences Corp., Piscataway, NJ (US)

( * ) Notice: Subject to any disclaimer, the term of this patent is extended or adjusted under 35 U.S.C. 154(b) by 498 days.

(21) Appl. No.: 14/002,534

(22) PCT Filed: Jan. 16, 2012

(86) PCT No.: PCT/SE2012/050029
§ 371 (c)(1),
(2), (4) Date: Aug. 30, 2013

(87) PCT Pub. No.: WO2012/118424
PCT Pub. Date: Sep. 7, 2012

(65) Prior Publication Data
US 2013/0335797 A1    Dec. 19, 2013

Related U.S. Application Data

(60) Provisional application No. 61/447,709, filed on Mar. 1, 2011.

(51) Int. Cl.
G02B 26/00    (2006.01)
G02B 21/00    (2006.01)
(Continued)

(52) U.S. Cl.
CPC ......... *G02B 21/0048* (2013.01); *G02B 21/06* (2013.01); *G02B 21/16* (2013.01);
(Continued)

(58) Field of Classification Search
CPC .... G02B 26/00; G02B 26/105; G02B 26/123; G02B 26/02; G02B 21/00; G02B 21/0036; G02B 21/0048
(Continued)

(56) References Cited

U.S. PATENT DOCUMENTS 4,433,894 A    2/1984   Hanson et al.
4,682,842 A    7/1987   Brueggemann
(Continued)

FOREIGN PATENT DOCUMENTS

EP    0 541 460 A2    5/1993
GB    1575313 A       9/1980
(Continued)

OTHER PUBLICATIONS

Japanese Notice of Allowance for JP Application No. 2013-556576 mailed Oct. 4, 2016 (5 pages).

*Primary Examiner* — Stephone B Allen
*Assistant Examiner* — Rahman Abdur
(74) *Attorney, Agent, or Firm* — Eversheds Sutherland (US) LLP

(57) ABSTRACT

Various beam selectors for selectively placing one of at least two beams of light along the same output path are disclosed. In one aspect, a beam selector receives at least two substantially parallel beams of light. The beam selector includes a plate with an aperture so that when one of the at least two beams is selected for transmission, the beam selector directs only the selected beam along an output path through the aperture. The plate can also serve to block transmission of unselected beams. The output path through the aperture is the same for each of the at least two beams when each beam is selected. Beam selectors can be incorporated into fluorescence microscopy instruments to selectively place particular excitation beams along the same path through the microscope objective lens and into a specimen to excite fluorescence of fluorescent probes attached to a particular component of the specimen.

17 Claims, 12 Drawing Sheets

(51) Int. Cl.
 *G02B 21/16* (2006.01)
 *G02B 26/08* (2006.01)
 *G02B 27/14* (2006.01)
 *G02B 21/06* (2006.01)
 *G02B 26/10* (2006.01)

(52) U.S. Cl.
 CPC ....... *G02B 26/0858* (2013.01); *G02B 26/105* (2013.01); *G02B 27/141* (2013.01); *G02B 2207/113* (2013.01)

(58) Field of Classification Search
 USPC ......... 359/199.2, 199.3, 202.1, 201.2, 204.1, 359/388, 368, 840, 839
 See application file for complete search history.

(56) References Cited

U.S. PATENT DOCUMENTS

| | | | |
|---|---|---|---|
| 4,805,974 A * | 2/1989 | Brueggemann | G02B 26/123 359/216.1 |
| 6,084,716 A | 7/2000 | Sanada et al. | |
| 7,692,879 B2 * | 4/2010 | Steinert | G02B 7/004 359/368 |
| 2001/0043403 A1 | 11/2001 | Engelhardt | |
| 2002/0113200 A1 * | 8/2002 | Hajjar | G02B 6/35 250/227.26 |
| 2002/0163704 A1 | 11/2002 | Hayashi et al. | |
| 2002/0167709 A1 | 11/2002 | Sowa et al. | |
| 2003/0179372 A1 | 9/2003 | Knebel | |
| 2005/0146784 A1 | 7/2005 | Vogt | |
| 2006/0017001 A1 | 1/2006 | Donders et al. | |
| 2006/0114554 A1 * | 6/2006 | Suzuki | G02B 7/102 359/380 |
| 2007/0007353 A1 | 1/2007 | Danielson et al. | |
| 2007/0153373 A1 * | 7/2007 | Uhl | G02B 21/0048 359/386 |
| 2008/0088918 A1 | 4/2008 | O'Connell | |

FOREIGN PATENT DOCUMENTS

| | | |
|---|---|---|
| JP | S63-269114 A | 11/1988 |
| JP | H01-195403 A | 8/1989 |
| JP | 2291141 A | 11/1990 |
| JP | 6012510 A | 1/1994 |
| JP | H11-213437 A | 8/1999 |
| JP | 2003-228034 A | 8/2003 |
| JP | 2003-279860 A | 10/2003 |
| JP | 2010-175625 A | 8/2010 |
| WO | 2008/009581 | 1/2008 |
| WO | WO 2009/091902 | 7/2009 |

* cited by examiner

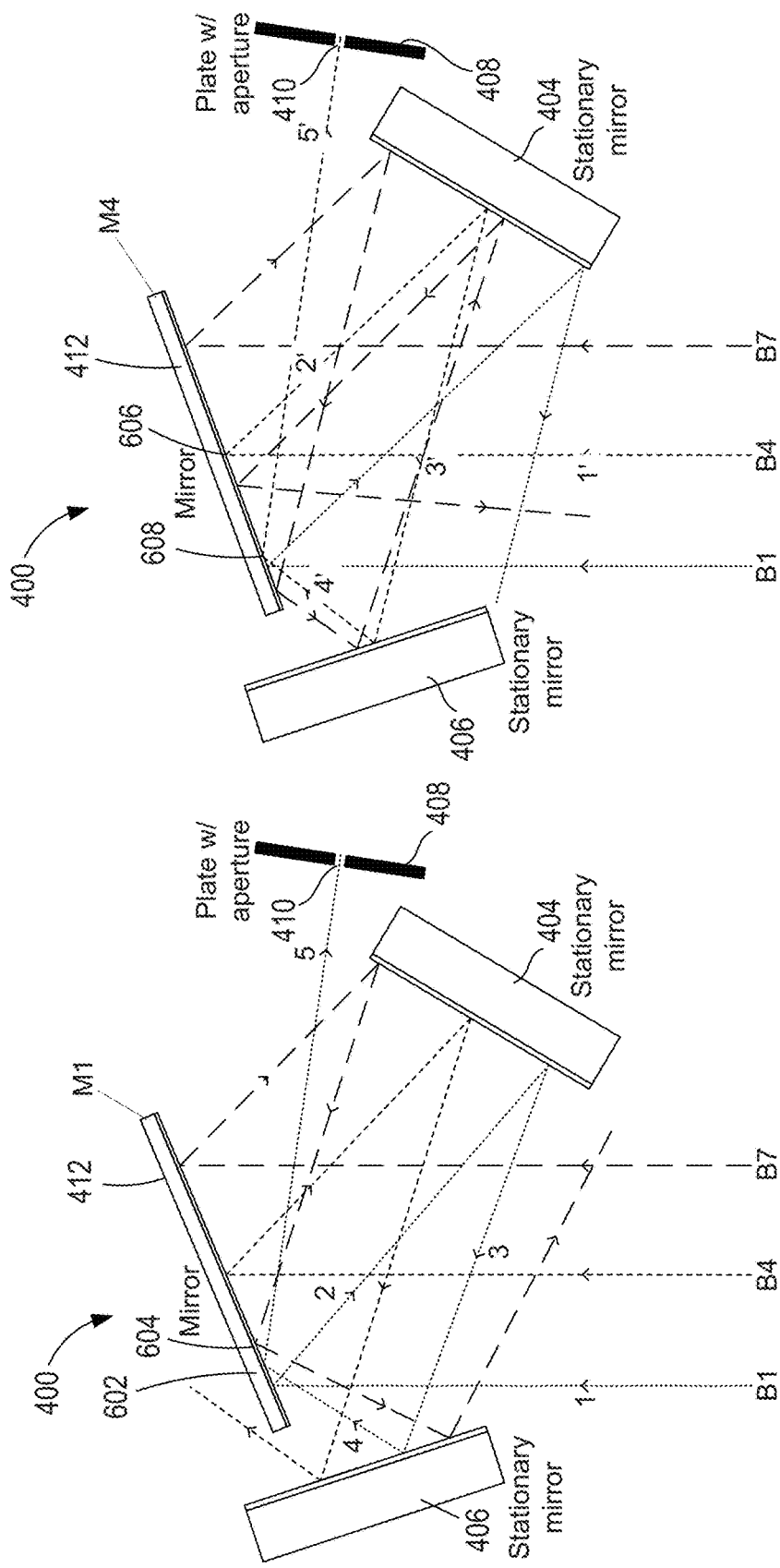

LASER BEAM SELECTORS

CROSS-REFERENCE TO A RELATED APPLICATION

This application is a filing under 35 U.S.C. 371 of international application number PCT/SE2012/050029, filed Jan. 16, 2012, published on Sep. 7, 2012 as WO 2012/118424, which claims the benefit of Provisional Application No. 61/447,709; filed Mar. 1, 2011.

TECHNICAL FIELD

This disclosure relates to fluorescence microscopy and, in particular, to systems for selecting excitation laser beams in fluorescence microscopy instruments.

BACKGROUND

In recent years, technical improvements in epifluorescence microscopy have centered on increasing the contrast between fluorescently labeled specimen components and background. As a result, many thousands of fluorescent probes have been developed to provide a means of labeling many different cellular, subcellular and molecular components of a biological specimen. In addition, the large spectral range of available fluorophores allows simultaneous imaging of different components. In order to image different components of a specimen, the different components are labeled with fluorophores that fluoresce at different wavelengths, but each fluorophore is excited with an excitation beam of a different wavelength. As a result, those working in epifluorescence microscopy have directed much attention to developing efficient and cost effective ways of superimposing the excitation beams so that the beams travel along the same path through the objective lens into the specimen. Gas-tube lasers and stacks of dichroic mirror are two systems that have been consider for producing superimposed excitation beams. Gas-tube lasers typically emit a single beam of light composed of several distinct wavelengths and a stack of dichroic mirrors can be used to combine excitation beams that emanate from different light sources. FIG. 1 shows an example of two dichroic mirrors 102 and 104 stacked to superimpose three excitation beams of different wavelengths $\lambda_1$, $\lambda_2$ and $\lambda_3$ represented by patterned lines 106-108, respectively. Dichroic mirror 102 transmits the beam 106 and reflects the beam 107 and dichroic mirror 104 transmits the beams 106 and 107 and reflects the beam 108 to form a superimposed beam 110 composed of all three wavelengths.

However, typical gas-tube lasers are large, cost prohibitive, inefficient, and unstable. Gas-tube lasers also have short lifetimes and emit light over a very limited range of wavelengths. On the other hand, although the dichroic mirror-based approach is versatile, each time an excitation beam is added to the superimposed beam, a separate dichroic mirror is added to the stack which leads to substantial inefficiency as the non-negligible losses accumulate. For instance, as shown in FIG. 1, the beam 106 already passes through the two dichroic mirrors 102 and 104. Addition of a third dichroic mirror to the stack to reflect a fourth wavelength and transmit the wavelengths $\lambda_1$, $\lambda_2$ and $\lambda_3$ would further attenuate the beam 106. In addition, neither gas-tube lasers nor dichroic mirror stacks provide switching between the different excitation beams on the sub-millisecond time scale or faster. With the dichroic mirror-based approach, it is possible to place shutters in the path of each beam input to the stack. However, each shutter adds substantial cost to the instrument and shutters are not able to achieve the desired sub-millisecond switching speeds between different excitation beams. For the above described reasons, engineers, scientists, and fluorescent microscope manufacturers continue to seek fast, efficient, and cost effective systems for placing excitation beams along the same path.

SUMMARY

Various beam selectors for selectively placing one of at least two beams of light along the same output path from the beam selectors are disclosed. In one aspect, a beam selector receives at least two substantially parallel beams of light output from separate light sources. The beam selector includes a plate with an aperture so that when one of the at least two beams is selected for transmission, the beam selector directs only the selected beam along an output path through the aperture in the plate. The plate can also serve to block transmission of unselected beams. The output path through the aperture is the same for each of the at least two beams when each beam is selected for transmission. The beam selectors can be incorporated into fluorescence microscopy instruments to selectively place particular excitation beams along the same path through the microscope objective lens and into a specimen to excite fluorescence of fluorescent probes attached to a particular component of the specimen.

DESCRIPTION OF THE DRAWINGS

FIGS. 6A-6C show example snapshots of internal paths traveled by three beams through the selector shown in FIG. 4.

DETAILED DESCRIPTION

Figure 1:
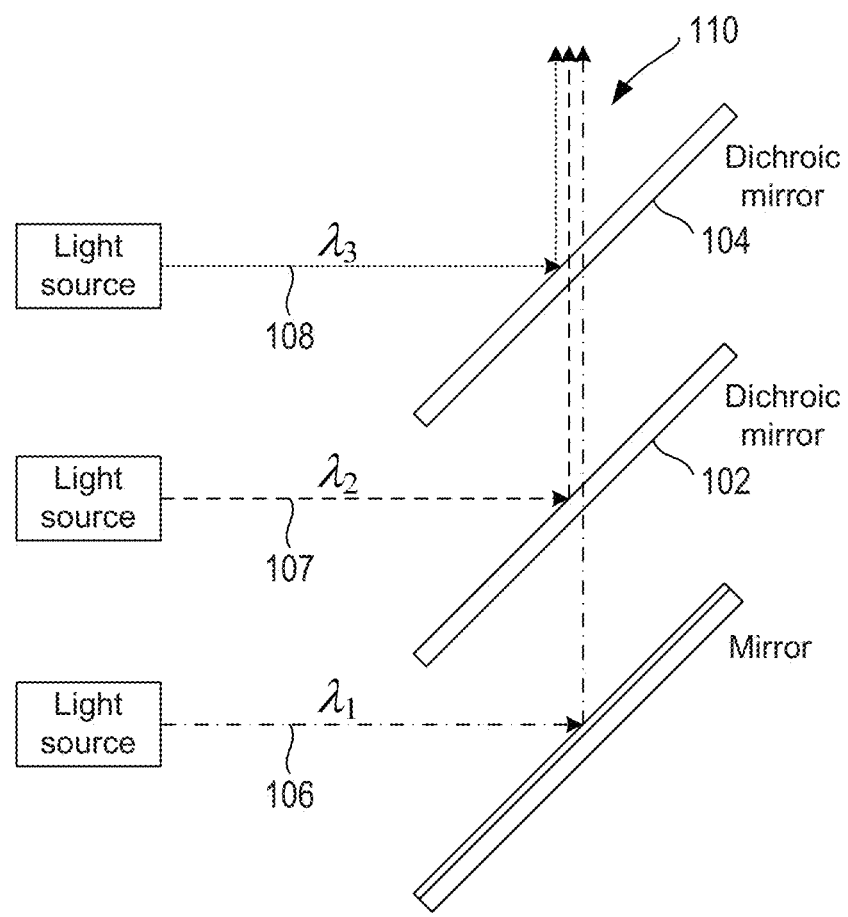
FIG. 1 shows an example of two dichroic mirrors stacked to superimpose three excitation beams of different wavelengths.
Figure 2:
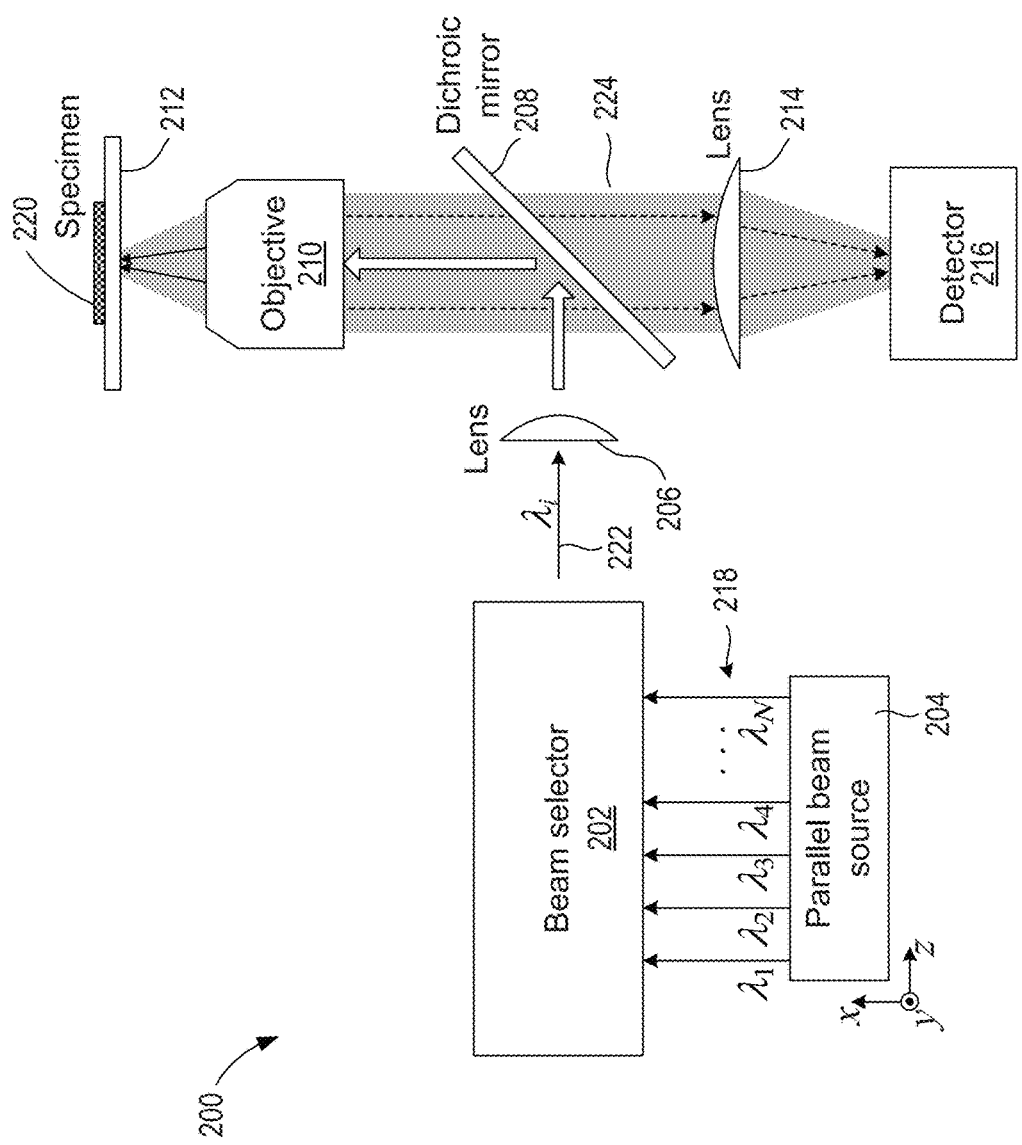
FIG. 2 shows a schematic representation of an example fluorescence microscopy instrument that includes a beam selector.

FIG. 2 shows a schematic representation of an example fluorescence microscopy instrument 200 that includes a beam selector ("BS") 202. There are many different types of fluorescent microscopy instruments and corresponding optical paths. The instrument 200 is not intended to represent the optical paths within all the different, well-known variations of fluorescence microscopy instruments, but is instead intended to illustrate the general principals of integrating a BS into fluorescence microscopy instruments. The instrument 200 includes a parallel laser beam source 204, the BS 202, a first lens 206, a dichroic mirror 208, an objective lens 210, a stage 212, a second lens 214, and a detector 216. As shown in the example of FIG. 2, the beam source 204 emits N substantially parallel beams 218 of excitation light to the beam selector 202, where N is a positive integer. Each of the beams 218, denoted by $\lambda_1, \lambda_2, \lambda_3, \ldots \lambda_N$, is a collimated, high-intensity, substantially monochromatic beam of light of a single wavelength, or light within a very narrow band of wavelengths, of the electromagnetic spectrum. A specimen 220 disposed on the stage 212 is composed of numerous different components, many of which are labeled with different fluorescent probes. Each beam output from the beam source 202 stimulates a fluorescent emission from a fluorophore used to image a particular component of the specimen 220. The BS 202 receives the excitation beams 218 and only outputs the excitation beam selected to excite fluorescence of the fluorophore attached to the component of the specimen 220 to be imaged. For example, suppose a first component of the specimen 220 is selected for imaging. The beam selector 202 is operated to only output the excitation beam 222, that excites the fluorophore attached to the component. The other excitation beams are blocked by the BS 202. The lens 206 focuses the excitation beam 222 and the dichroic mirror 208 reflects the excitation beam into the back of the objective lens 210, which, in turn, directs the excitation beam into the specimen 220. A portion of the fluorescent light emitted from the fluorophore is captured and collimated by the objective lens 210 into a beam, represented by a shaded region 224, that passes through the dichroic mirror 208 and is focused onto the detector 216 by the second lens 214. The detector 216 can be a photomultiplier, photodiode, or a solid-state charged coupled device ("CCD"). When a second component of the specimen 220 is selected for imaging, the beam selector 202 switches to only output the excitation beam that excites the type of fluorophore attached to the second component. In alternative instrument configurations, the dichroic mirror 208 can be configured to transmit the excitation beam and reflect the fluorescent light, in which case the locations of the BS 202, beam source 204 and lens 206 are switched with the lens 214 and the detector 216.

Figure 3:
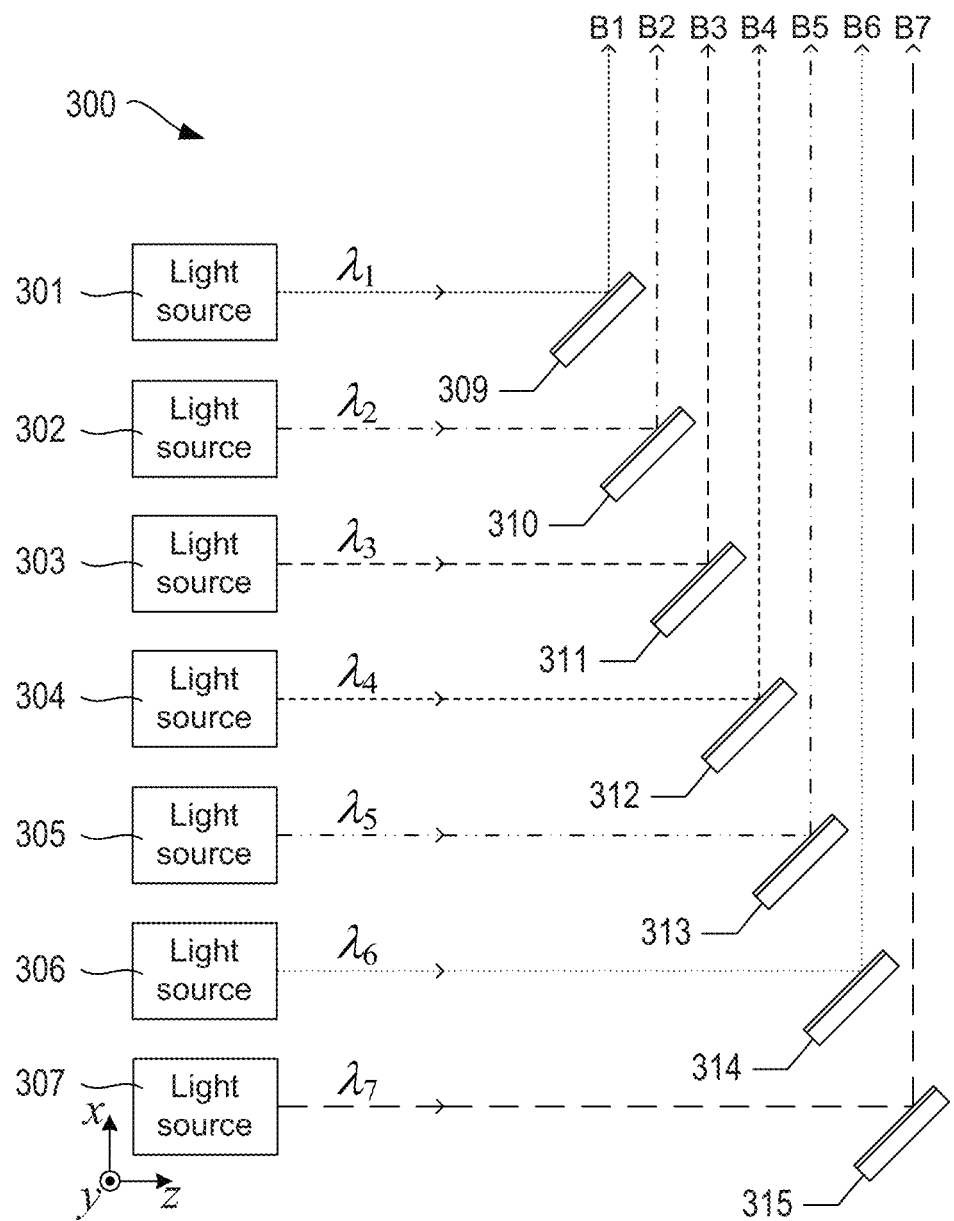
FIG. 3 shows a representation of an example parallel beam source.

The beam source 204 can be configured to output, in parallel, any suitable number of excitation beams. FIG. 3 shows a representation of an example parallel beam source 300 that includes seven separate light sources 301-307 that each emit light with one of seven different wavelengths denoted by $\lambda_1, \lambda_2, \lambda_3, \lambda_4, \lambda_5, \lambda_6$ and $\lambda_7$, respectively. For example, each light source can be a laser that emits a high-intensity, substantially monochromatic beam of light in a different, very narrow band of the electromagnetic spectrum or emits light with a single wavelength. The path each beam travels through the beam source 300 is represent by a differently patterned directional arrow denoted by B1, B2, B3, B4, B5, B6 and B7. In the example of FIG. 3, the beam source 300 includes seven mirrors 309-315 that are positioned to reflect the beams into substantially parallel paths with a desired spacing. Ideally the paths along which the beams travel are parallel or non-intersecting, but in practice, it is recognized that due to slight variations in the relative placement and orientation of the minors and light sources, the paths may be only approximately parallel or intersect at very long distances away from the beam source 300. As a result, the paths along which the beams are output are referred to as approximately parallel.

Figure 4A:
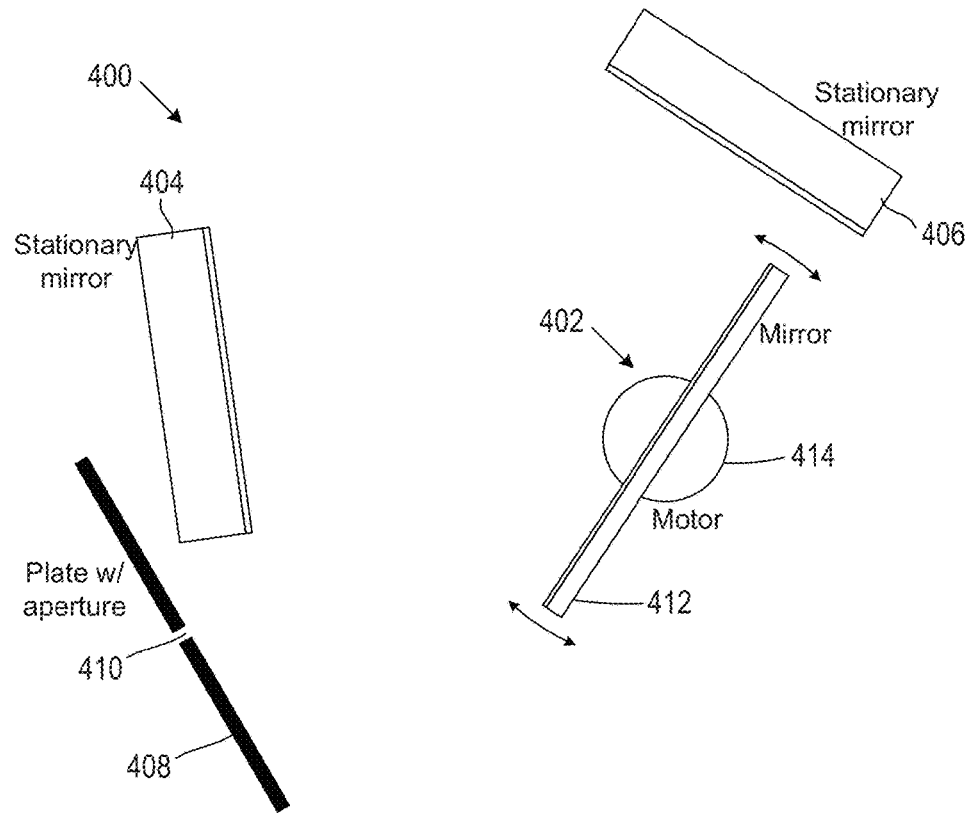
FIGS. 4A-4B show a top-plan view and an isometric view of an example beam selector, respectively.
Figure 4B:
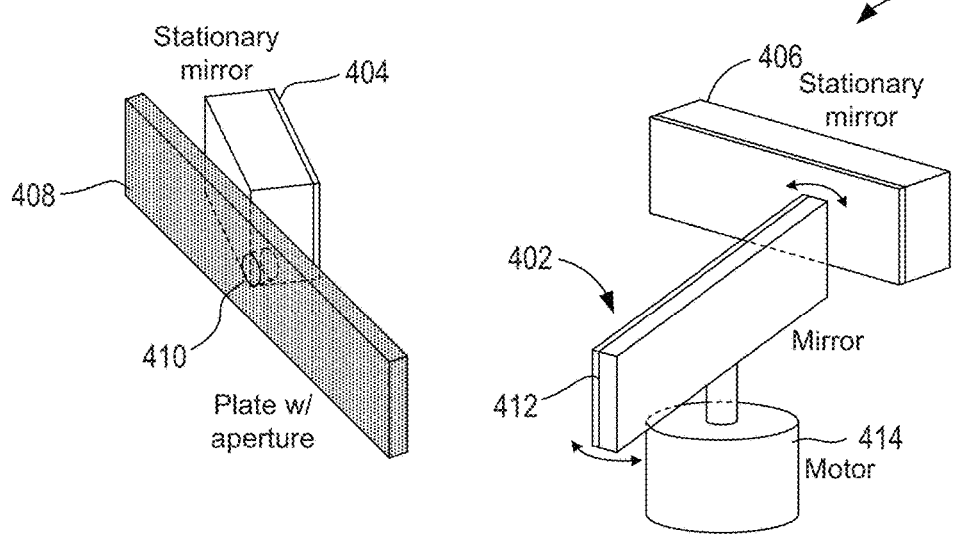

FIGS. 4A-4B show a top-plan view and an isometric view of an example beam selector 400. The selector 400 includes a scanning mirror 402, a first flat stationary mirror 404, a second flat stationary mirror 406 and a plate 408 with an aperture 410. The reflective surface of the first mirror 404 is angled toward the region between the scanning mirror 402 and second mirror 406, and the reflective surface of the second mirror 406 is angled toward the region between the scanning mirror 402 and the first mirror 404, and the reflective surfaces of the mirrors are substantially perpendicular to the same plane. In the example of FIGS. 4A-4B, the scanning mirror 402 is a galvanometer mirror that includes a flat pivot mirror 412 attached to a rotatable shaft of a motor 414, which can be a galvanometer motor or a stepper motor. Alternatively, the scanning mirror can be a piezoelectric controlled mirror. As shown in FIGS. 4A-4B, the mirror 412 is rotated back and forth by the motor 414 through a range of angles.

Figure 5:
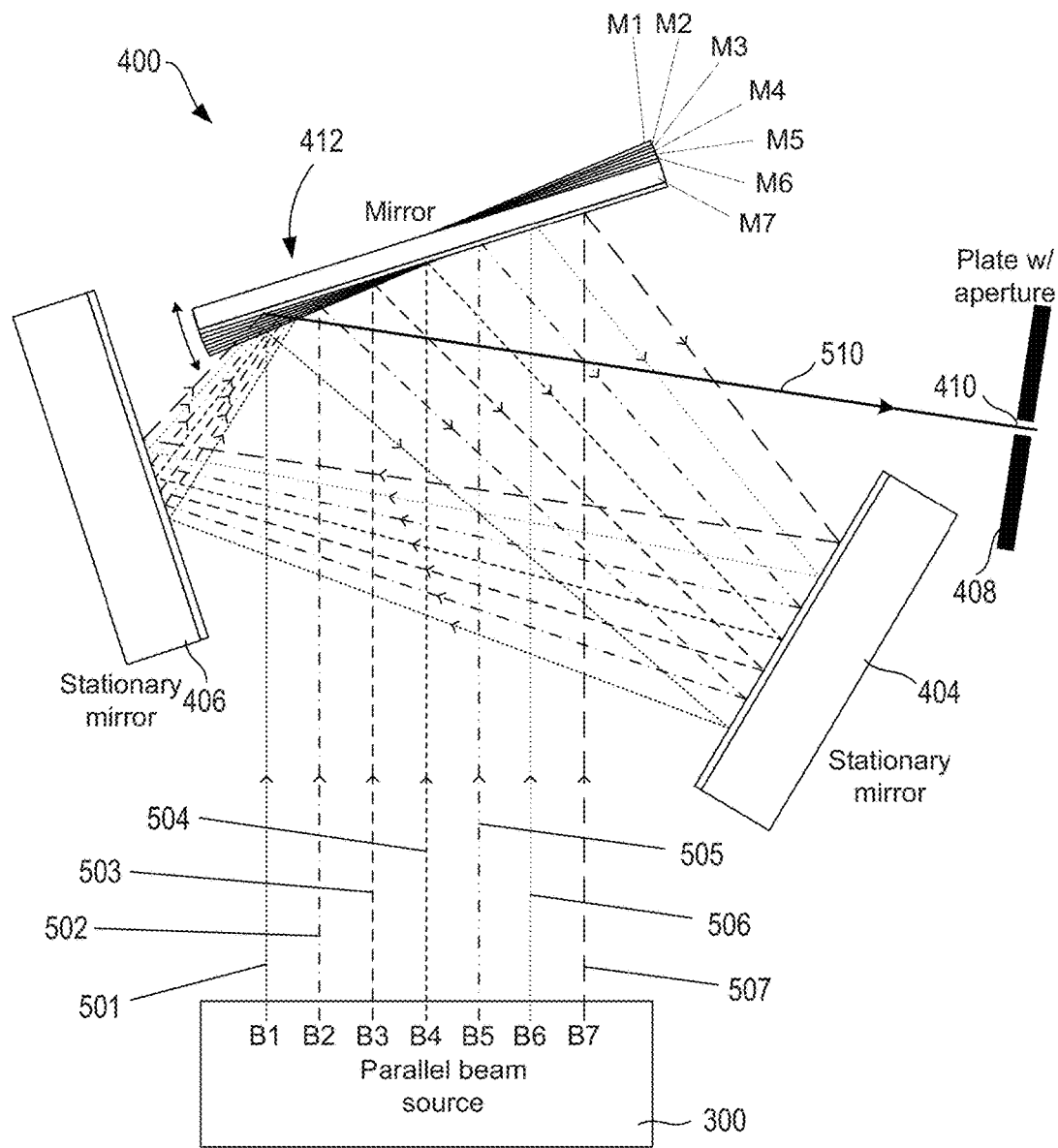
FIG. 5 shows a top-plan view of the beam selector shown in FIG. 4 in operation.

FIG. 5 shows a top-plan view of the beam selector 400 in operation. FIG. 5 includes a representation of the beam source 300 with the seven different substantially parallel beam paths B1, B2, B3, B4, B5, B6 and B7 directed toward the mirror 412. FIG. 5 shows the mirror 412 rotated into seven different positions denoted by M1, M2, M3, M4, M5, M6 and M7. The differently patterned lines 501-507 represent the path each beam travels through the selector 400 when the pivot mirror 412 is rotated into one of the seven different positions. Each beam travels between the mirrors 404, 406 and 412 within the same plane. As shown in the example of FIG. 5, the stationary mirrors 404 and 406 and the pivot mirror 412 are positioned in the same plane so that each beam is output along the same path 510 through the aperture 410 in the plate 408. In other words, when the mirror 412 is rotated into the position Mj, where j is an integer between 1 and 7, the beam Bj is output from the selector 400, after four reflections, along the path 510. While the mirror 412 is in the position Mj, the other beams Bk, where k is an integer between 1 and 7 and k≠j, do not exit the selector 400.

Figure 6C:
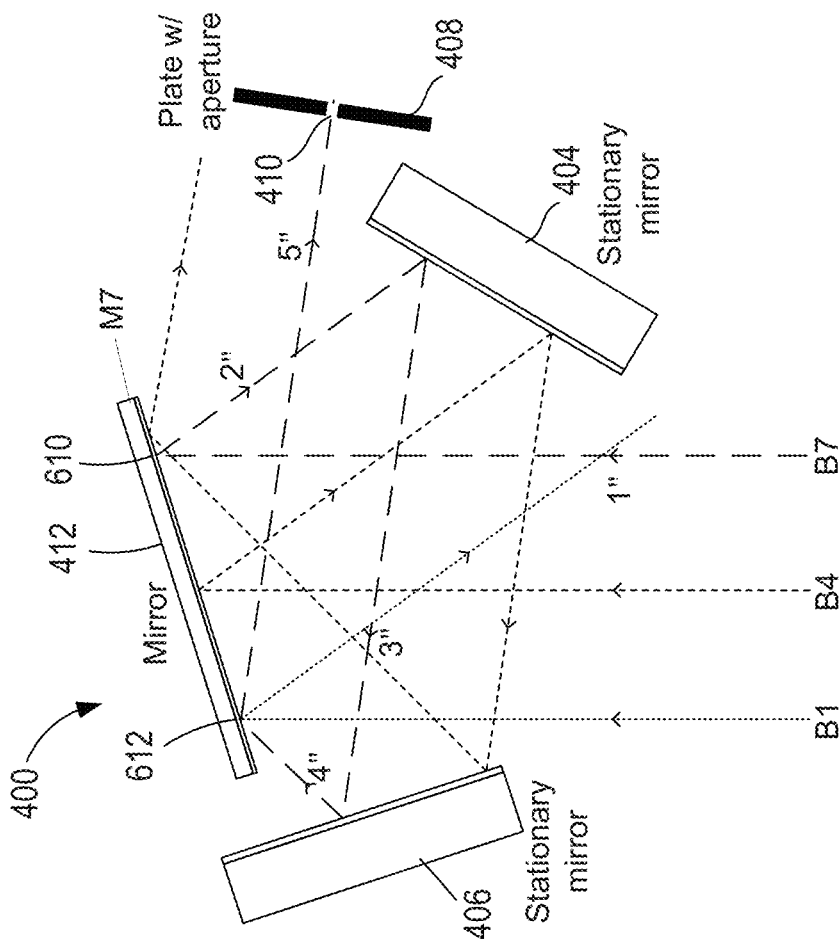

As shown in FIG. 5, for each rotational position of the pivot mirror 412 that results in one of the beams being placed on the path 510, the beam is reflected off of the mirror 412 a first time, the first stationary mirror 404 one time, the second stationary mirror 406 one time, and off of the mirror 412 a second time for a total of four reflections. Also, the other six beams are reflected so that they do not reach the aperture 410 in the plate 408. FIGS. 6A-6C show example snapshots of internal paths of three of the seven beams (i.e., beams B1, B4 and B7) traveling through the selector 400 when the pivot mirror 412 is rotated into the three positions M1, M4 and M7, respectively. In FIG. 6A, the pivot mirror 412 is rotated into position M1. The beam B1 strikes the pivot mirror 412 at a point 602 and undergoes four reflections off of the mirrors 404, 406 and 412 with the internal paths numbered sequentially 1, 2, 3 and 4. The $5^{th}$ path is created by a second reflection off of the pivot mirror 412 at the point 604, which places the beam B1 on the path through the aperture 410 also shown in FIG. 5 as the path 510. As shown in FIG. 6A, the other two beams B4 and B7 track different reflection paths that do not result in the beams B4 and B7 passing through the aperture 410. In FIG. 6B, the pivot mirror 412 is rotated into position M4. The beam B4 strikes the pivot mirror 412 at a point 606 and undergoes four reflections off of the mirrors 404, 406 and 412 with the internal paths numbered sequentially 1', 2', 3' and 4'. The $5^{th}$ path is created by a second reflection off of the pivot mirror 412 at the point 608, which places the beam B4 on the path through the aperture 410 also shown in FIG. 5 as the path 510. As shown in FIG. 6B, the other two beams B1 and B7 track different reflection paths that do not result in the beams B1 and B7 passing through the aperture 410. In FIG. 6C, the pivot mirror 412 is rotated into position M7. The beam B7 strikes the pivot mirror 412 at a point 610 and undergoes four reflections off of the minors 404, 406 and 412 with the internal paths numbered sequentially 1", 2", 3" and 4". The 5"$^{th}$ path is created by a second reflection off of the pivot mirror 412 at the point 612, which places the beam B7 on the path through the aperture 410 also shown in FIG. 5 as the path 510. As shown in FIG. 6C, the other two beams B1 and B4 track different reflection paths that do not result in the beams B1 and B4 passing through the aperture 410.

Figure 7A:
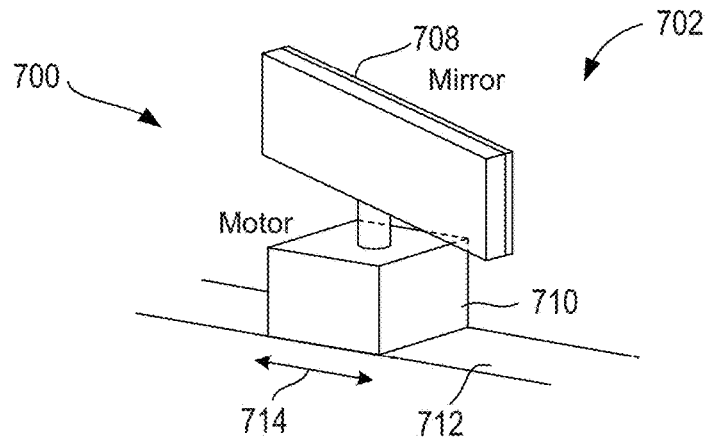
FIGS. 7A-7C show an isometric view and two top-plan views of an example beam selector.
Figure 7B:
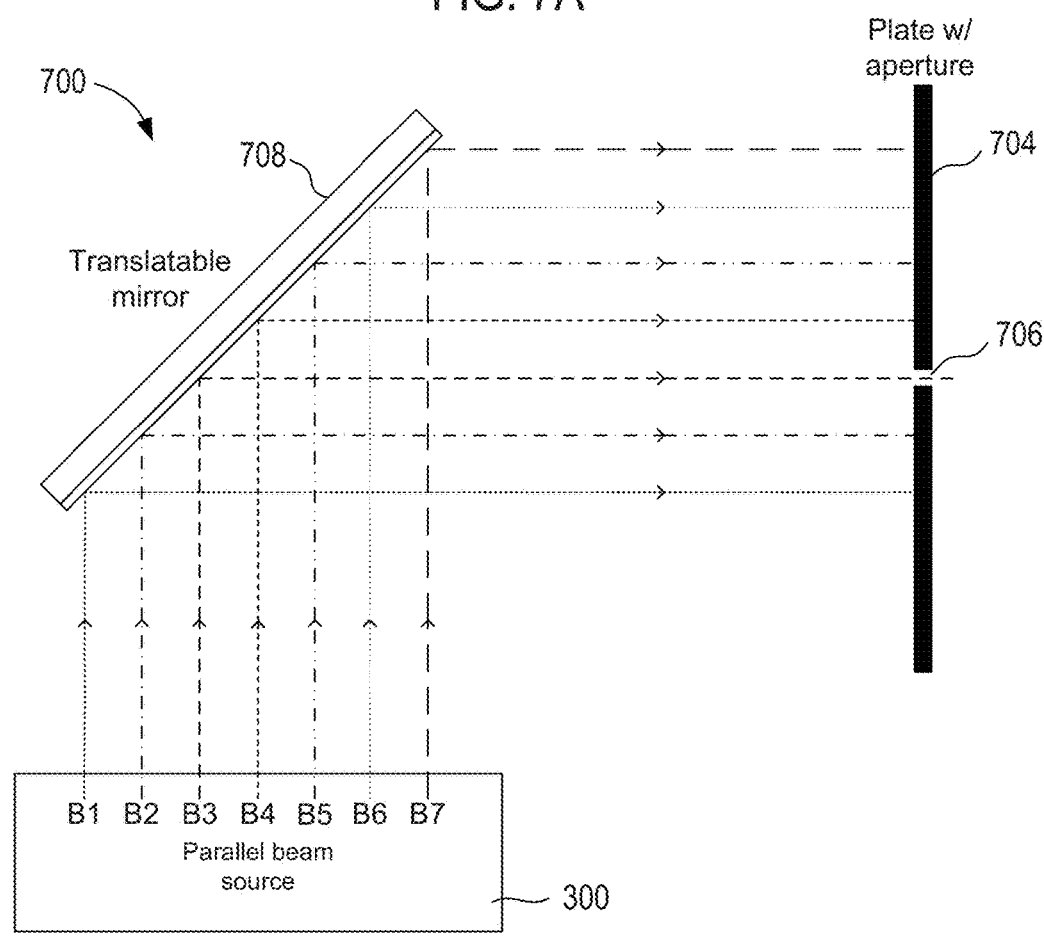
Figure 7C:
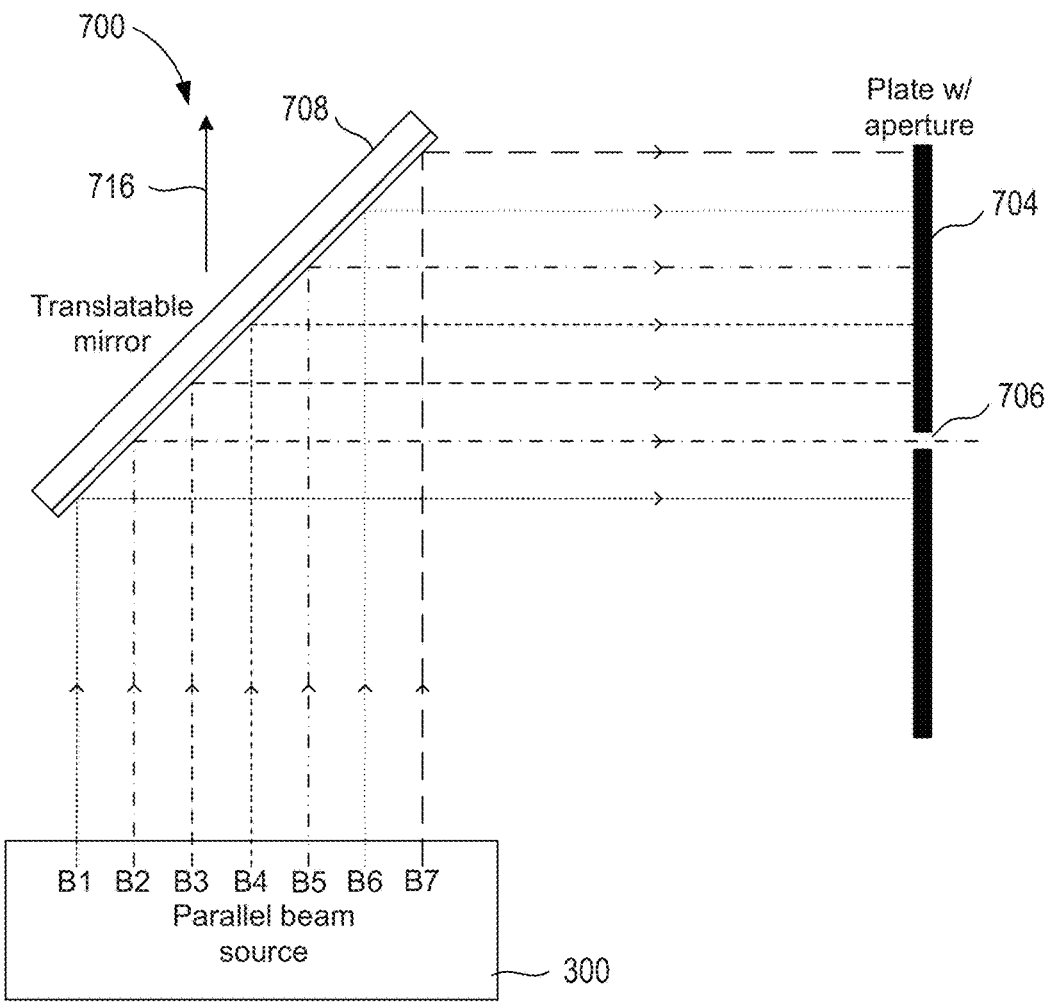

The beam selector 400 is implemented with the scanning mirror 402 to provide sub-millisecond output beam selection. FIGS. 7A-7C show an isometric view and two top-plan views of an example beam selector 700. The selector 700 includes a scanning mirror 702 and a plate 704 with an aperture 706. In FIG. 7A, the scanning mirror 702 includes a flat, fixed position mirror 708 attached to a motor 710 that translates the mirror 708 back and forth along a track 712, as indicated by directional arrow 714. As shown in FIGS. 7B and 7C, the mirror 708 is oriented so that the beams B1, B2, B3, B4, B5, B6 and B7 output from the beam source 300 strike the mirror at 45° to the mirror normal. In practice, the mirror 708 can be placed at any suitable angle to reflect the beams toward the plate 704 and is not limited to a 45° angle with respect to paths of the beams. In FIG. 7B, the mirror 708 is positioned so that all of the beams strike the mirror 708, but only the beam B3 is reflected off of the mirror 708 and passes through the aperture 706, while the rest of beams are blocked by the plate 704. In FIG. 7C, the motor 710 has been used to translate the mirror 708 in the direction 716 so that the beam B2 passes through the aperture 706, while the other beams are blocked by the plate 704.

Figure 8A:
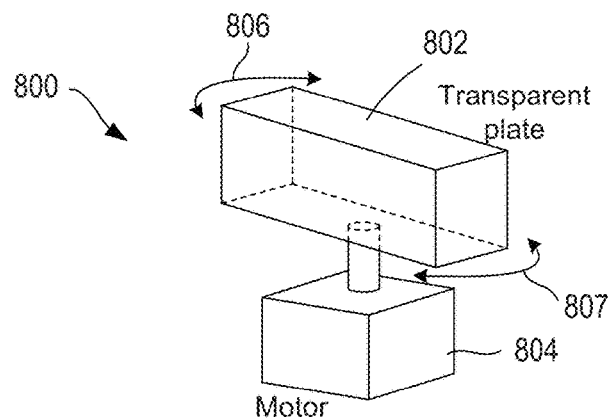
FIG. 8A-8D show an isometric view and three top-plan views of an example beam selector.
Figure 8B:
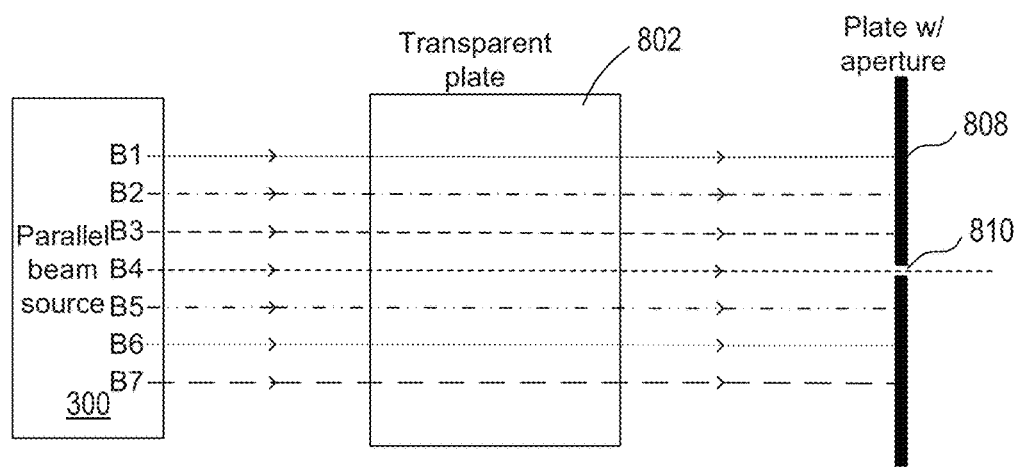
Figure 8C:
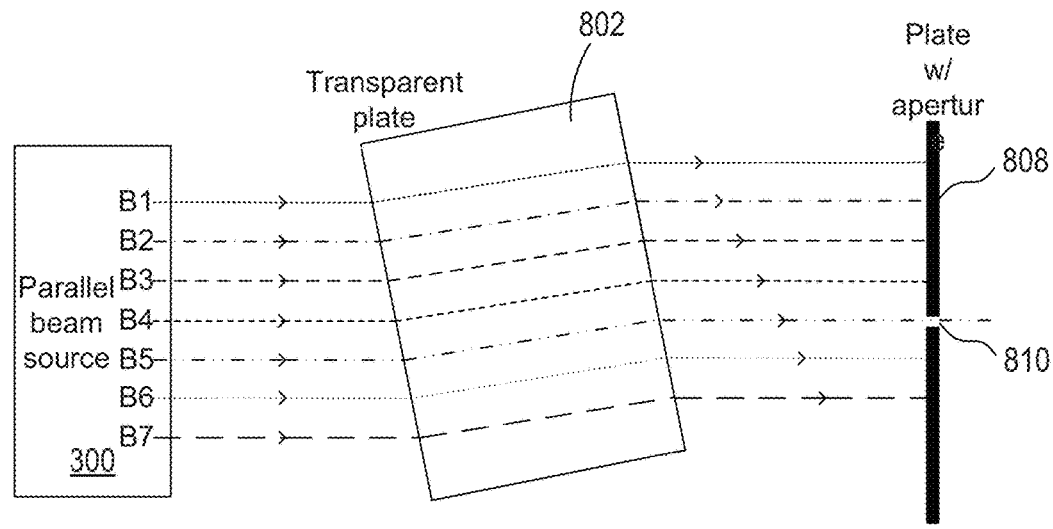
Figure 8D:
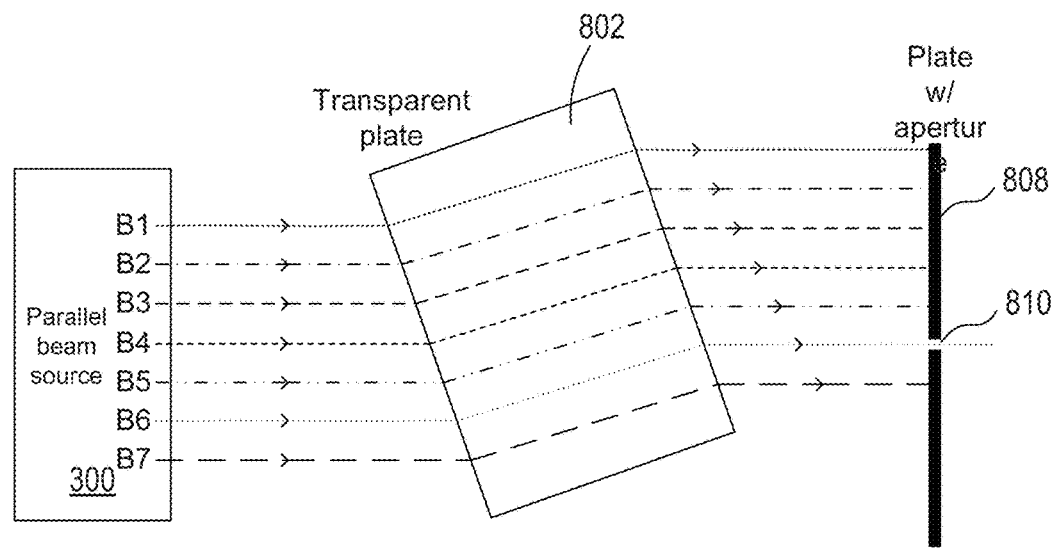

FIG. 8A-8D show an isometric view and three top-plan views of an example beam selector 800. The selector 800 includes a transparent plate 802 attached to a motor 804 that rotates the mirror 802 back and forth, as indicated by directional arrows 806 and 807. The transparent plate 802 can be composed of glass or a transparent plastic with a desired index of refraction, and the motor 804 can be a galvanometer motor or a stepper motor. FIGS. 8B-8D show the selector 800 includes an opaque plate 808 with an aperture 810. FIGS. 8B-8D show how the transparent plate 802 is rotated to refract the parallel beams of light output from the beam source 300 so that one of the beams is output through the aperture 810, while the other beams are blocked by the plate 808. In FIG. 8B, the transparent plate 802 is rotated so that the beam passes through the transparent plate 802 with normal incidence. In this position, the central beam B4 passes through the aperture 810 while the other beams are blocked by the plate 808. In the examples of FIGS. 8C-8D, the transparent plate 802 is rotated so that the beams are refracted, as a result, the beams a shifted to that a beam other than the central beam B4 passes through the aperture 810. In FIG. 8C, the transparent plate 802 is rotated to refract the beams with a beam off set that results in the beam B5 passing through the aperture 810 while the other beams are blocked by the plate 808. In FIG. 8D, the transparent plate 802 is rotated farther resulting in a larger beam off set that places the beam B6 on a path through the aperture 810 while the other beams are blocked by the plate 808.

Figure 9:
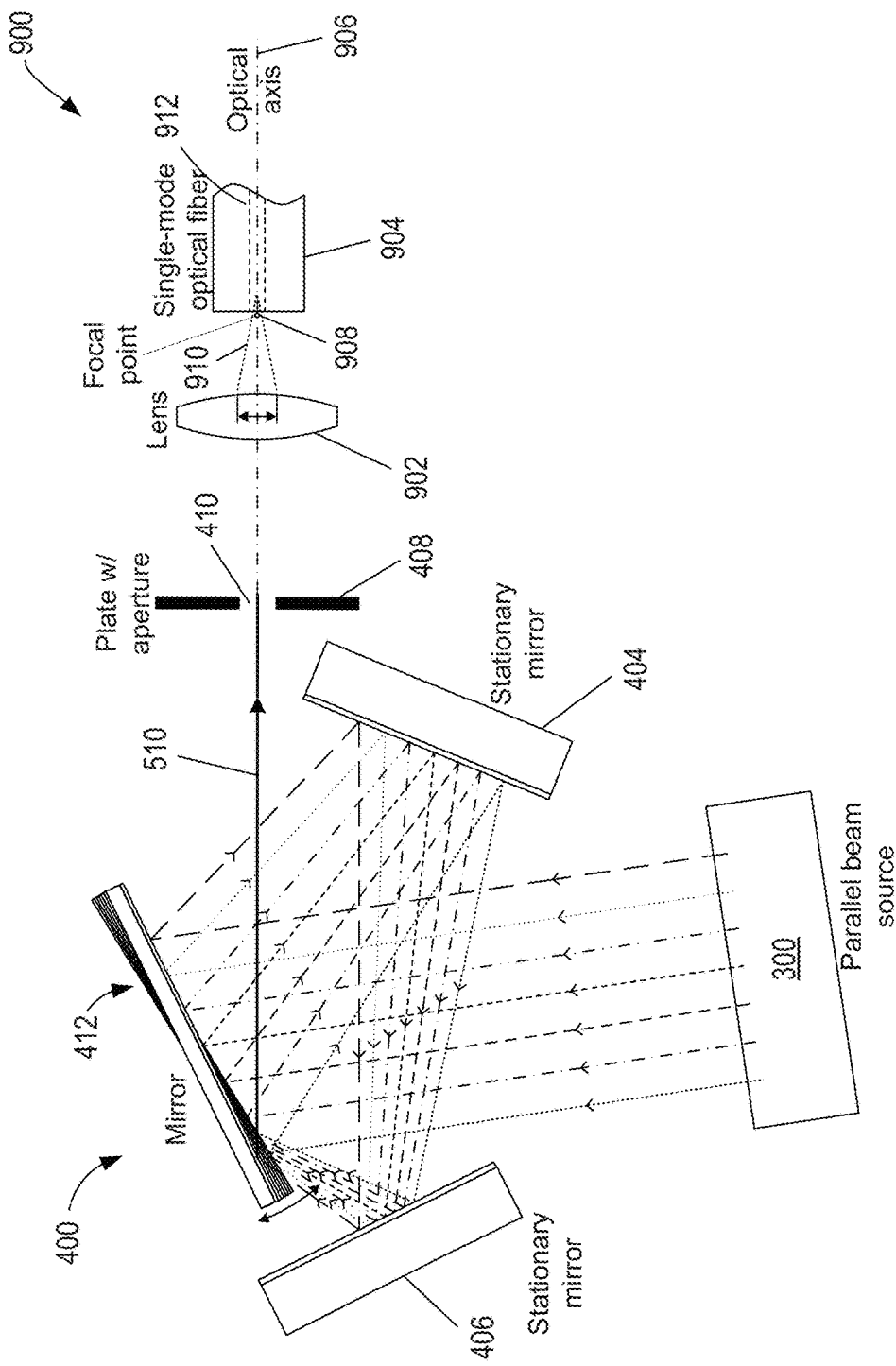
FIG. 9 shows a schematic representation of a beam selector combined with an example implementation of a beam launch.

In alternative embodiments, the beam selector 400 can be combined with a beam launch that is used to control the irradiance of the beam selected. FIG. 9 shows a schematic representation of the beam selector 400 combined with an example implementation of a beam launch 900. In the example of FIG. 9, each beam is output from the parallel beam source 300 as a substantially monochromatic beam of light. The launch 900 includes the plate 408 with the circular aperture 410 and includes a lens 902, and a single-mode optical fiber 904. As shown in FIG. 9, the center of the aperture 410, optical axis of the lens 902, and optical axis of the fiber 904 are coincident as indicated by dot-dashed line 906. The lens 902 is positioned along the optical axis 906 so that the focal point 908 of the lens 902 lies along the optical axis 906 and the diameter of the fiber 904 acceptance cone 910 at the lens 902 is approximately equal to the diameter of the aperture 410. The diameter of the acceptance cone 910 is determined by the acceptance angle with the optical axis 906, which is correlated with the numerical aperture of the fiber 904. Light focused onto the focal point 908 lies within the acceptance cone 910 and is confined to the core 912. In other words, the lens 902 shapes the beam of light output from the aperture 410 so that the light lies within the acceptance cone 910. In order to achieve maximum coupling efficiency of the light into the fiber 904, the diameter of each beam is tuned to approximately match the diameter of acceptance cone 910 of the fiber 904. When the mirror 412 is rotated over a continuum of angles, the beam 510 is translated or shifted substantially perpendicular to the propagation direction of the beam 510, which coincides with the optical axis 906. As the beam 510 is translated substantially perpendicular to the optical axis 906, a portion of the beam 510 is cut off by the plate 408 around the edge of aperture 410, which, in turn, is used to control the irradiance of the beam that eventually enters the core 912. The single-mode optical fiber 904 provides spatial filtering of the asymmetrical beams output from the lens 902. For example, when the beam 510 is translated perpendicular to the optical axis 906, the beam that reaches the core 912 has an asymmetrical irradiance distribution. Because the fiber 904 is a single-mode optical fiber, even though the beam 510 enters the fiber 904 with an asymmetrical irradiance distribution, the beam is output at the opposite end of the fiber 904 with a symmetrical irradiance distribution.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the following claims and their equivalents:

The invention claimed is:

1. A beam selector for selecting one of at least two beams of light comprising:
 a scanning mirror arranged to receive at least two beams of light;
 two stationary mirrors; and
 a plate with an aperture,
 wherein the scanning mirror is arranged to be rotated into at least two positions,
 wherein each of the at least two positions respectively selects a different one of the beams of light,
 wherein the selected beam of light in each of the at least two positions undergoes a first reflection off of the scanning mirror, one reflection off of each of the stationary mirrors, and a second reflection off of the scanning mirror to place the selected beam of light on a path through the aperture, and wherein the scanning mirror, two stationary mirrors, and plate are arranged so that a first of the stationary mirrors is angled toward a region between the scanning mirror and a second of the stationary mirrors, and the reflective surface of the second stationary mirror is angled toward a region between the scanning mirror and the first stationary mirror, and wherein each position of the at least two positions of the scanning mirror results in the selected beam to undergo a total of four reflections.

2. The beam selector of claim 1, wherein the scanning mirror further comprises a flat mirror attached to a rotatable shaft of a motor and wherein the motor further comprises one of a galvanometer motor and a stepper motor.

3. The beam selector of claim 1, wherein the scanning mirror further comprises a piezoelectric controlled mirror.

4. The beam selector of claim 1, wherein each position of the at least two positions of the scanning mirror results in the selected beam to undergo a first reflection off of the scanning mirror, a second reflection off of a first of the stationary mirrors, a third reflection off of a second of the stationary mirrors, and a fourth reflection off of the scanning mirror to place the beam on the path through the aperture.

5. The beam selector of claim 1, wherein the output path through the aperture is the same for each of the at least two excitation beams when each beam undergoes the second reflection off of the scanning mirror.

6. The beam selector of claim 1, wherein the scanning mirror is to be rotated into each of the at least two positions in less than 0.2 milliseconds.

7. The beam selector of claim 1, wherein the at least two beams are substantially parallel.

8. A fluorescence microscopy instrument comprising:
a parallel beam source that emits at least two substantially parallel, excitation beams of light;
a beam selector including a plate with an aperture, the selector to select only one of the at least two excitation beams for transmission on an output path through the aperture and the plate to block transmission of unselected excitation beams; and
an objective to receive the selected excitation beam and direct the beam into a specimen to excite fluorescence of fluorescent probes attached to a particular component of the specimen, and
a beam launch located in the path of the excitation beam, wherein the beam launch is positioned to receive the excitation beam and configured to attenuate the excitation beam based on an amount by which the excitation beam is to be translated,
wherein the beam selector further comprises:
a scanning mirror to receive the at least two excitation beams; and
two stationary mirrors, wherein the scanning mirror is to be rotated into at least two positions, each position to select one of the excitation beams to undergo a first reflection off of the scanning mirror, one reflection off of each of the stationary mirrors, and a second reflection off of the scanning mirror to place the excitation beam on the path through the aperture;
wherein the scanning mirror, two stationary mirrors, and the plate are arranged so that a first of the stationary mirrors is angled toward a region between the scanning mirror and a second of the stationary mirrors, and the reflective surface of the second stationary mirror is angled toward a region between the scanning mirror and the first stationary mirror.

9. The fluorescence microscopy instrument of claim 8, wherein the parallel beam source comprises at least two lasers, each laser to emit a substantially monochromatic beam of light of a single wavelength or within a narrow range of wavelengths.

10. The fluorescence microscopy instrument of claim 9, wherein the scanning mirror is a flat mirror attached to a rotatable shaft of a motor and wherein the motor further comprises one of a galvanometer motor and a stepper motor.

11. The fluorescence microscopy instrument of claim 9, wherein the scanning mirror is a piezoelectric controlled mirror.

12. The fluorescence microscopy instrument of claim 9, wherein each position of the at least two positions of the scanning mirror results in the selected beam to undergo a first reflection off of the scanning mirror, a second reflection off of a first of the stationary mirrors, a third reflection off of a second of the stationary mirrors, and a fourth reflection off of the scanning mirror to place the beam on the path through the aperture.

13. The fluorescence microscopy instrument of claim 8, wherein the path through the aperture is the same for each of the at least two excitation beams when each beam undergoes the second reflection off of the scanning mirror.

14. The fluorescence microscopy instrument of claim 8, wherein the beam selector includes a mirror and a motor to translate the mirror, wherein the mirror is angled to reflect the excitation beams toward the plate, and the motor is to translate the mirror so that only the selected beam is reflected along the output path.

15. The fluorescence microscopy instrument of claim 8, wherein the beam selector includes a transparent plate and a motor to rotate the transparent plate, wherein the transparent plate is in the path of the at least two excitation beams so that the beams pass through the transparent plate toward the plate, and the motor is to rotate the transparent plate to refract the at least two excitation beams so that only the selected beam travels the output path.

16. The fluorescence microscopy instrument of claim 8 further comprising:
a dichroic mirror to reflect the selected excitation beam to the objective lens and transmit the fluorescent light;
a photodetector array; and
a lens disposed between the dichroic mirror and the photodetector, wherein the lens is to focus the fluorescent light onto the photodetector.

17. The fluorescence microscopy instrument of claim 8, wherein the beam source emits the at least two excitation beams so that the excitation beams are substantially parallel.

* * * * *